Figures 1, 2:
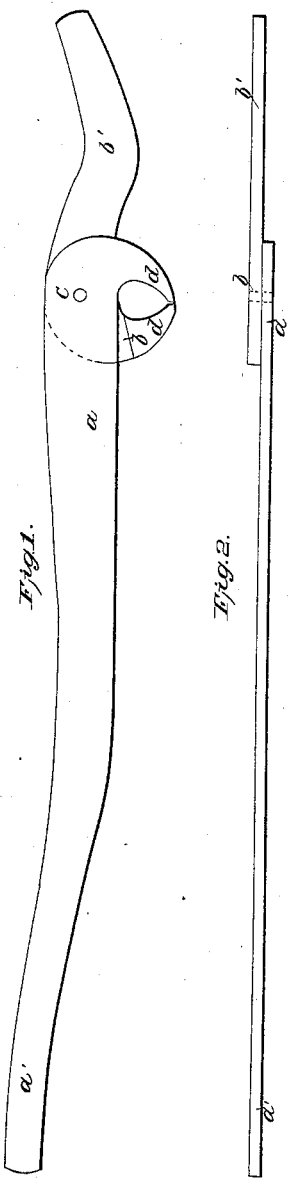

D. T. Robinson,
Nail Extractor.
N° 59,657.                    Patented Nov. 13, 1866.

Witnesses:
Inventor:
Daniel T. Robinson

UNITED STATES PATENT OFFICE.

DANIEL T. ROBINSON, OF BOSTON, MASSACHUSETTS.

IMPROVEMENT IN TOOLS FOR DRAWING NAILS.

Specification forming part of Letters Patent No. 59,657, dated November 13, 1866.

*To all whom it may concern:*

Be it known that I, DANIEL T. ROBINSON, of Boston, in the county of Suffolk and State of Massachusetts, have invented a new and useful Implement for Drawing Nails, &c.; and do hereby declare the following to be a full, clear, and exact description thereof, reference being had to the accompanying drawings, making part of this specification, and in which—

Figure 1 is a side elevation, and Fig. 2 a top view, of my invention. Fig. 3 is a side elevation of a modified form of construction of my invention.

In the drawings, $a$ and $b$ represent two jaw-levers, hinged together, as shown at $c$.

The lever $a$ has a long arm, $a'$, the purpose of which is to operate the implement by being grasped in a person's hand, while the lever $b$ has a much shorter and somewhat curved arm, $b'$, it serving as a bearing or fulcrum for the implement while drawing a nail from any object.

The two levers are formed with fellow jaws $d\ d$, as shown in Fig. 1, and so constructed and combined that as the longer lever or its arm $a'$ is raised the two jaws shall meet and close tightly upon a nail or other object which it is intended to operate upon.

In operating with the implement the jaws $d\ d$ are to be driven or sunken into the wood about the head of the nail sufficiently far to allow of their taking a firm grasp of it.

On raising the handle $a'$, the jaws will first close upon the nail, and next be raised upward by the action of the curved fulcrum-arm $b'$ and withdraw the nail nearly in a vertical line, or sufficiently so to leave the nail nearly straight, thereby injuring it comparatively little in comparison to what it would be if drawn by a common hammer.

My invention is valuable for opening boxes, as by extracting the nails without prying up the cover the said cover is not split and broken.

For taking up floorings it will be found very advantageous, and for taking down partitions, sheathing, &c., and for carpenters' use generally, it will be found highly useful.

I claim—

Constructing a nail-pulling device in the manner described, so that the jaws will clamp the nail by the action of applying force to the lifting-lever in raising the nail from its position, substantially as described.

DANIEL T. ROBINSON.

Witnesses:
CHAS. EDW. PARKER,
GEO. P. TOWLE.